US006650549B1

(12) United States Patent
Chiao (10) Patent No.: US 6,650,549 B1
(45) Date of Patent: Nov. 18, 2003

(54) HUB HAVING A BLUETOOTH SYSTEM (75) Inventor: Wen-Hao Chiao, Hsinchu (TW)

(73) Assignee: D-Link Corp., Hsinchu (TW)

( * ) Notice: Subject to any disclaimer, the term of this patent is extended or adjusted under 35 U.S.C. 154(b) by 0 days.

(21) Appl. No.: 10/277,813

(22) Filed: Oct. 23, 2002

(51) Int. Cl.[7] .............................................. H01R 12/16
(52) U.S. Cl. ...................... 361/785; 361/760; 361/792; 343/703; 710/129; 710/211
(58) Field of Search ................. 361/785, 760, 361/720, 736, 748, 792; 343/760, 703; 710/129, 211

(56) References Cited

U.S. PATENT DOCUMENTS 5,825,618 A * 10/1998 Schnoor et al. ............. 361/686
6,151,645 A * 11/2000 Young et al. ................. 710/63
6,272,644 B1 * 8/2001 Urade et al. ................. 713/320
6,380,930 B1 * 4/2002 Van Ruymbeke ........... 345/173
6,452,910 B1 * 9/2002 Vij et al. ..................... 370/310

* cited by examiner

Primary Examiner—Michael Sherry
Assistant Examiner—Hung Bui
(74) Attorney, Agent, or Firm—Bacon & Thomas, PLLC (57) ABSTRACT

A hub includes a bluetooth system module coupled to a hub module. The hub module is also coupled to an upstream port and a plurality of downstream ports provided on a housing of the hub respectively enabling the hub to connect to an electronic device via the upstream port and to connect to a plurality of peripherals via the downstream ports for performing a wireless signal communication therebetween, thereby reducing the number of cables connected between the electronic device and peripherals.

4 Claims, 8 Drawing Sheets

HUB HAVING A BLUETOOTH SYSTEM

FIELD OF THE INVENTION

The present invention relates to hub coupled to a computer and more particularly to such a hub having a bluetooth system with improved characteristics.

BACKGROUND OF THE INVENTION

Figure 1:
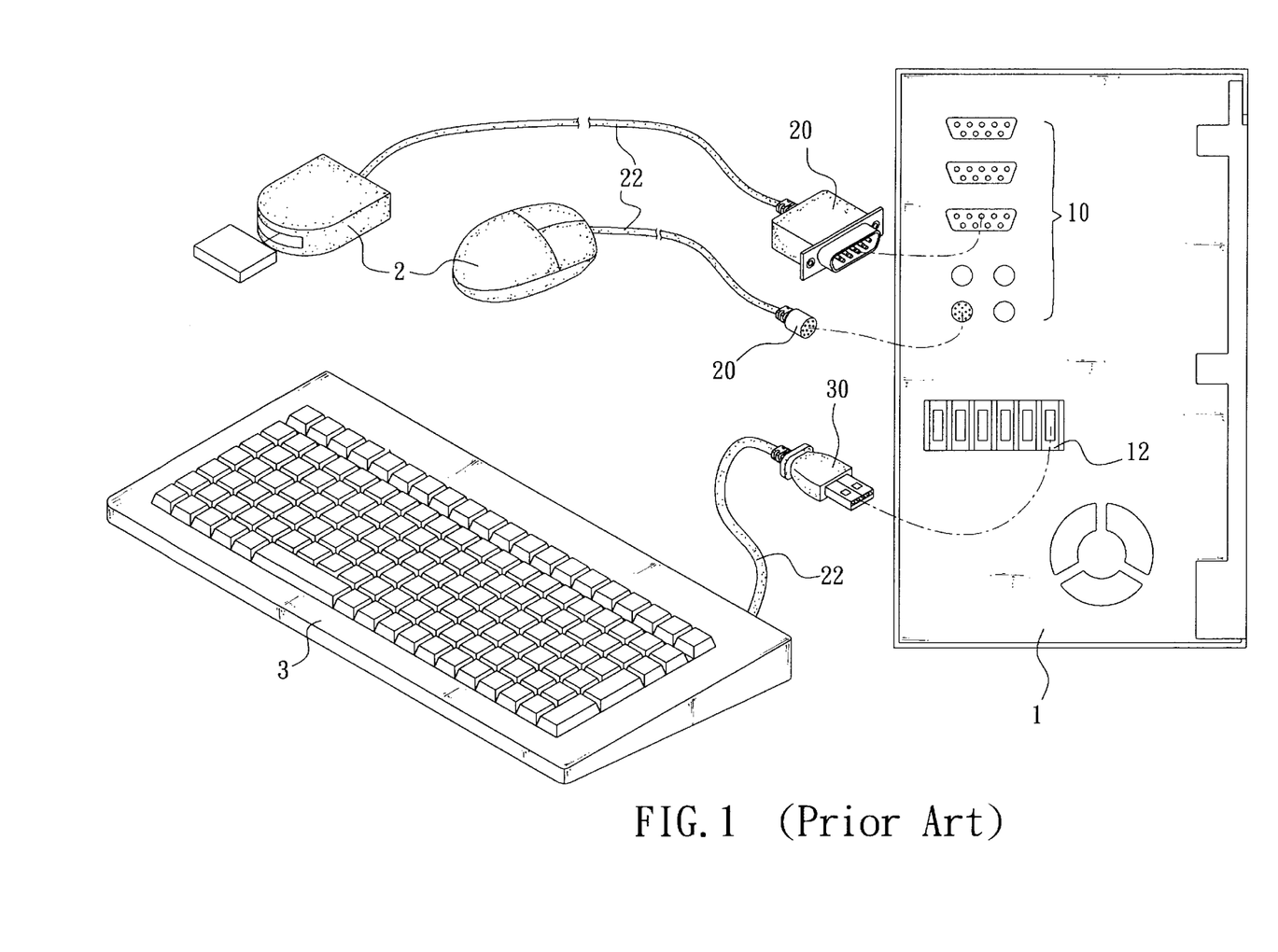
FIG. 1 depicts schematically the connection of a typical computer to a number of peripherals.

A conventional computer 1 is shown in FIG. 1 and comprises a plurality of connectors 10 on the rear panel of the computer 1. Each of the connectors 10 may have one of a variety of interface specifications such as PS2, LPT, 1394, and USB (Universal Serial Bus). Two first peripherals are shown in which one is a mouse having a connector 20 with an appropriate interface specification at an open end of a cable 22 extended therefrom. The second peripheral is a keyboard 3 having a connector 30 with the PS2 interface specification at an open end of another cable 22 extended therefrom. The connectors 20 of the peripherals 2 are coupled to mating connectors 10 on the computer 1 respectively. As such, signals can be sent from the peripherals 2 to the computer 1. Alternatively, the computer 1 can send signals to the peripherals 2 for processing therein.

The connector 20 of each peripheral 2 has one of the conventional interface specifications such as PS2, LPT, and 1394. In response to a coupling of the connector 20 to the conventional connector 10 on the computer 1, a driver of the peripheral 2 must be installed. Next, a shutdown has to be performed prior to restarting after the installation is completed. The computer 1 may then control the peripheral 2 after a completion of the above actions. The computer 1 will not operate normally if the connector 20 of the peripheral 2 is removed from the connector 10 in the installation process. Further, there is no connector 10 on the computer 1 available for coupling to a plurality of peripherals 2 if the number of connectors 10 is less than that of the peripherals 2.

Referring to FIG. 1 again, in response to a coupling of the peripheral 3 (e.g., keyboard) having a USB connector 30 and the computer 1, a driver of the peripheral 3 must be installed. Next, a user can use the computer 1 to control the peripheral 3 after a completion of the installation. The computer 1 still can operate normally even if the connector 30 of the peripheral 3 is removed from one of the connectors 12 on the computer 1 in the installation process. Further, the connector 30 of the peripheral 3 can be coupled to the computer 1 in any future time. Hence, it is convenient in use. Thus, the USB connectors are widely installed in the current peripherals.

Figure 2:
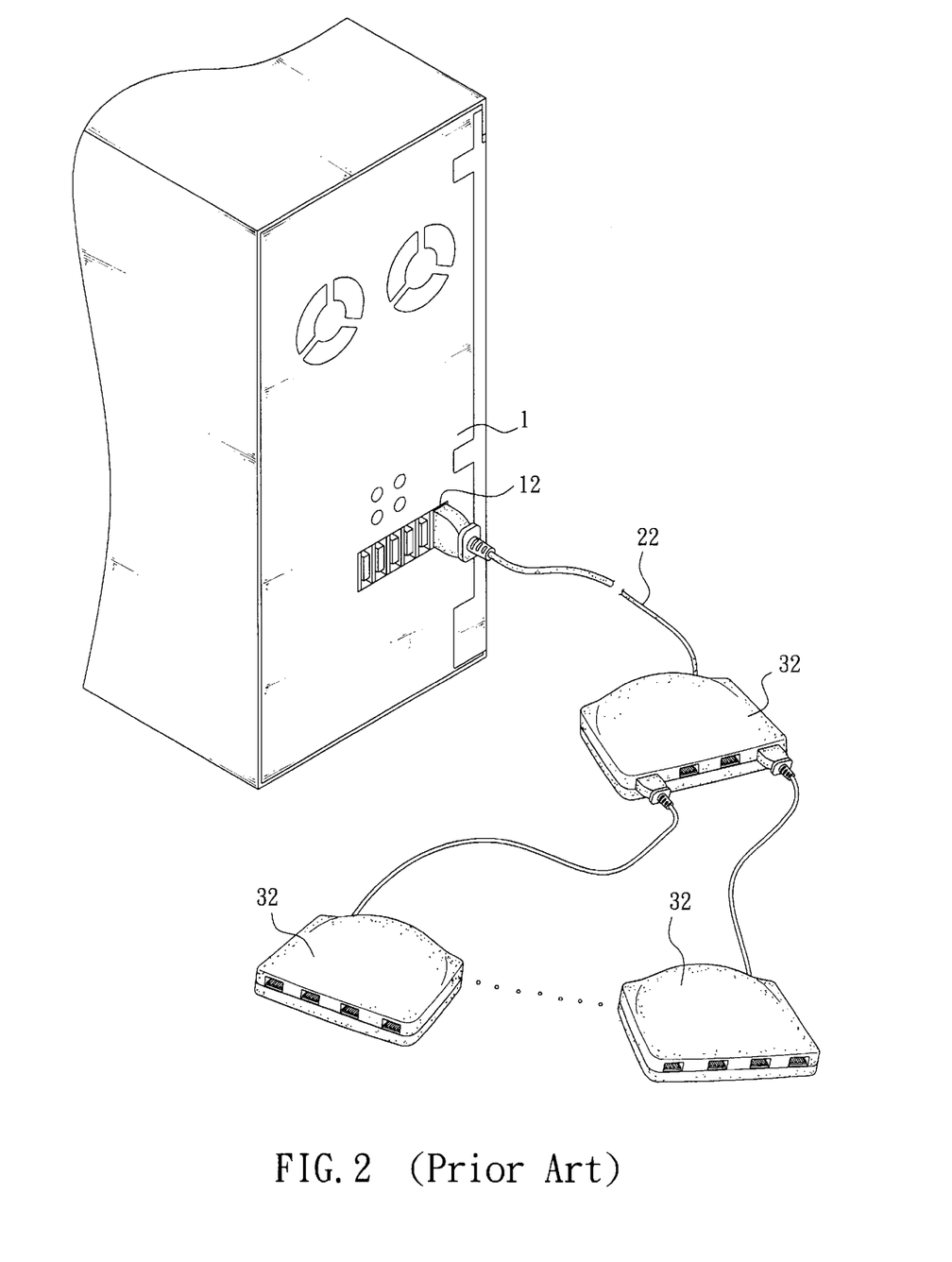
FIG. 2 is a perspective view depicting schematically the connection of the typical computer to a number of USB hubs.

Referring to FIGS. 1 and 2, as stated above, the USB connector 30 of the peripheral 3 can be coupled to the USB connector 12 on the computer 1 at any time. Hence, it is convenient in use. Further, the USB connector 12 on the computer 1 can be coupled to at least one of a plurality of USB hubs 32. Hence, the number of the USB connectors 12 can be increased up to 127 USB hubs. As a result, there is not need to worry about an insufficient number of connectors on the computer 1 available for coupling to peripherals.

However, the prior art (e.g., either the peripheral 2 having a connector 20 with a conventional interface specification or the peripheral 3 having the USB connector 30) suffered from several disadvantages. For example, the cable 22 of each of the peripherals 2 and 3 must be coupled to the computer 1 after the peripherals 2 and 3 have been positioned. Thus, a signal communication between the peripherals 2 and 3 and the computer 1 is made possible. It is seen that there is little space unoccupied if there are a number of peripherals coupled to the computer with the various cables 22 disposed on a supporting surface (e.g., desk). Further, there is very little space unoccupied after a computer, associated peripherals, and documents are placed on the desk in an office or at home. This is particularly true if the cables 22 of the peripherals 2 and 3 are additionally placed on the desk. Furthermore, it is messy to have such cables 22 randomly placed on the desk. Moreover, this configuration can cause inconvenience in use. Thus improvement exists.

SUMMARY OF THE INVENTION

A primary object of the present invention is to provide a hub having a bluetooth system. The hub comprises a bluetooth system module coupled to a hub module on the hub. Thus, the hub has a wireless signal transmission capability as the bluetooth system. Further, the hub is capable of performing a signal communication with any electronic device having a bluetooth system module within a predetermined range, thereby reducing the number of cables disposed on a desk. By utilizing the invention, it is possible of overcoming the above drawback of the prior art such as messy on the desk because many cables of peripherals coupled to the computer are randomly disposed on the desk.

The above and other objects, features and advantages of the present invention will become apparent from the following detailed description taken with the accompanying drawings.

DETAILED DESCRIPTION OF THE PREFERRED EMBODIMENTS

Figure 3:
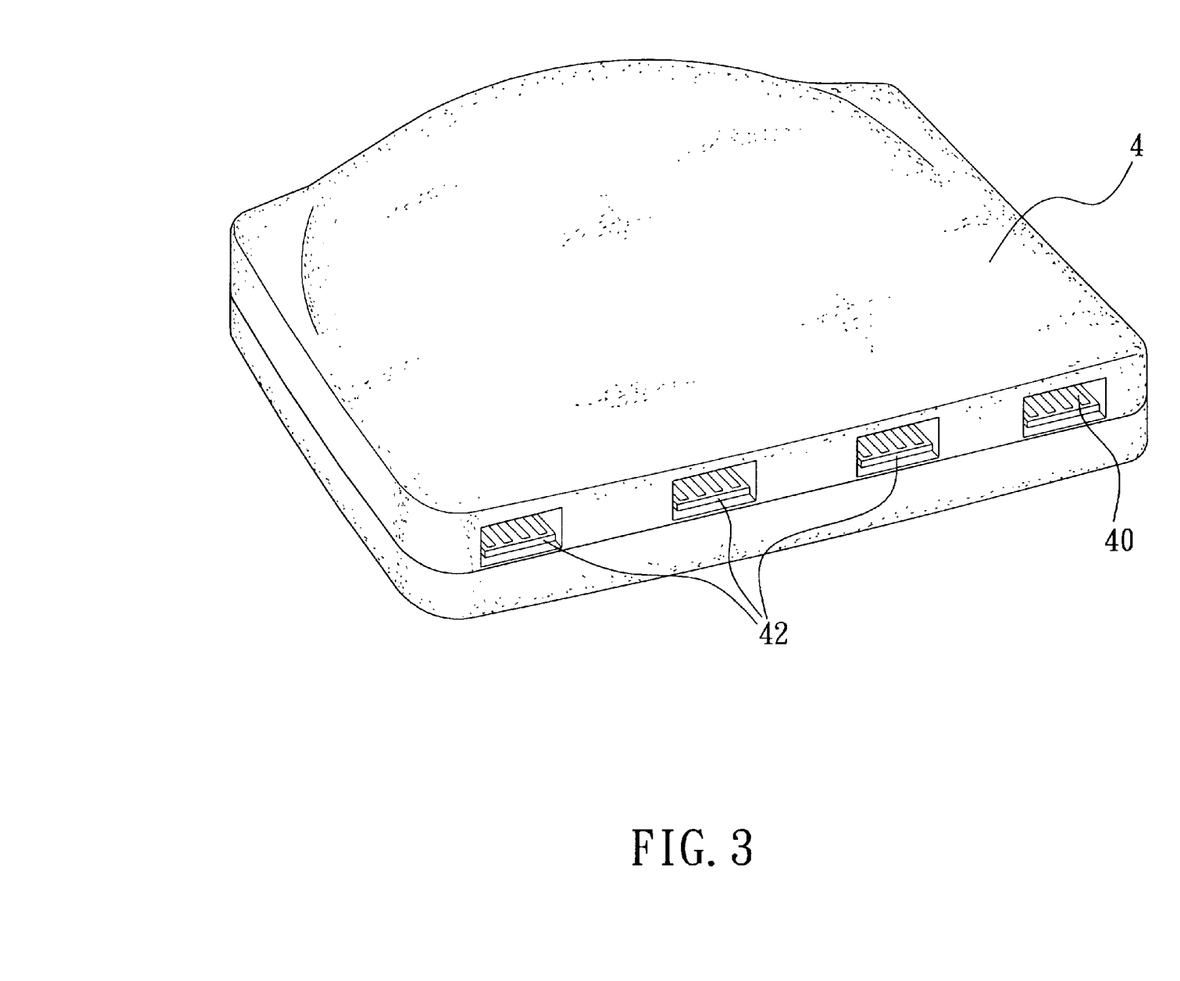
FIG. 3 is a perspective view of a preferred embodiment of a hub according to the invention.
Figure 4:
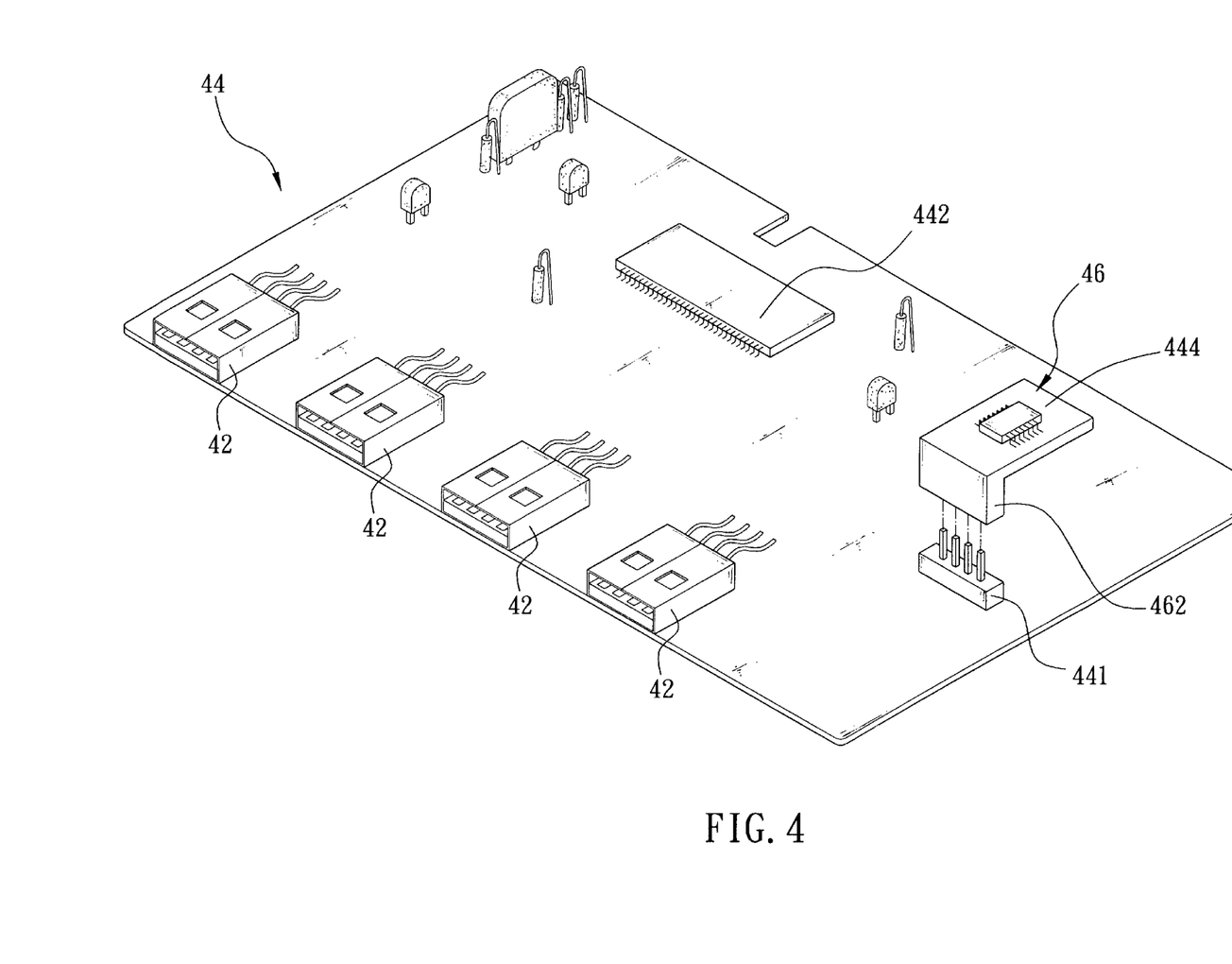
FIG. 4 is a perspective view of a circuit board of the hub shown in FIG. 3.
Figure 5:
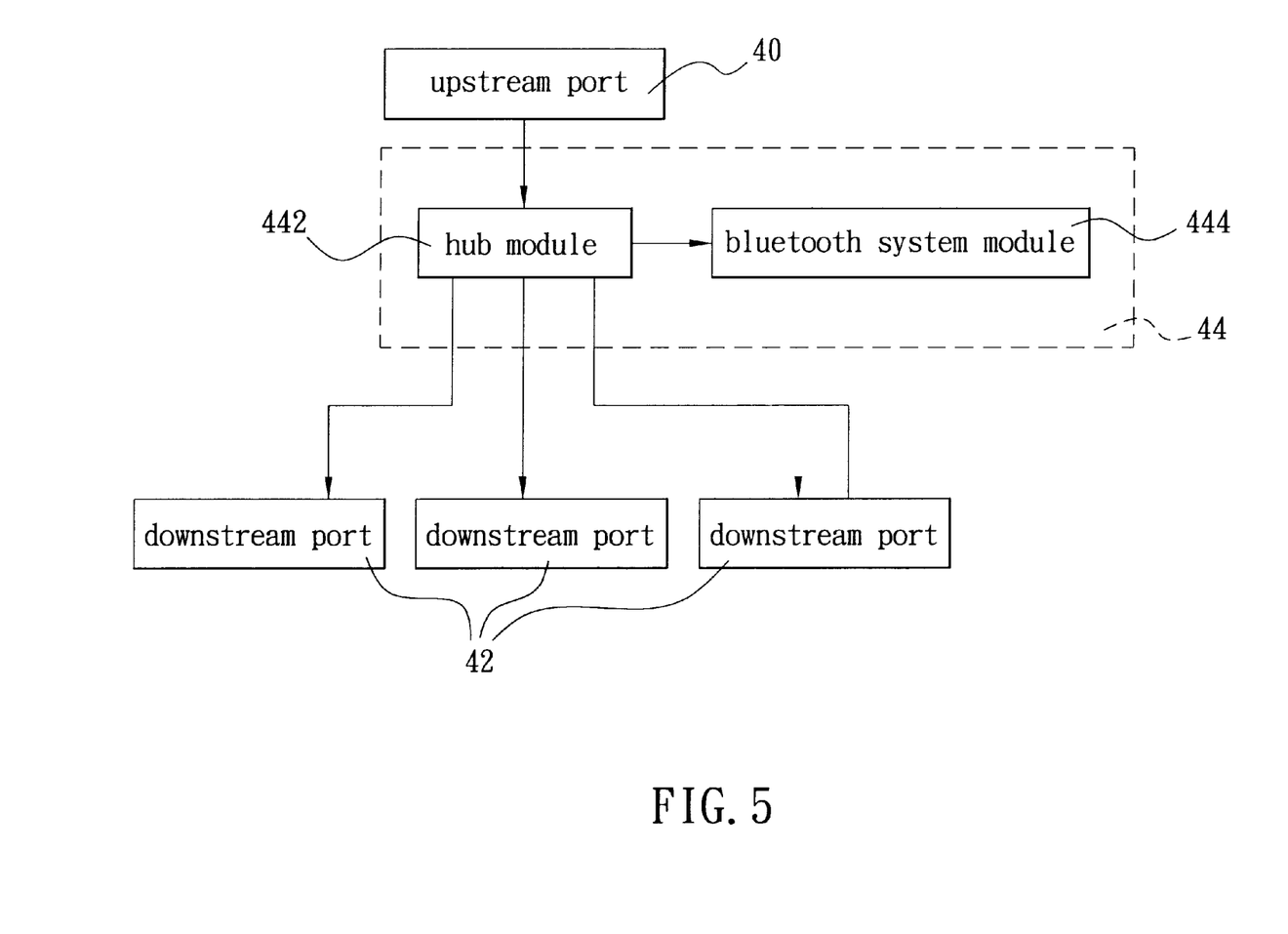
FIG. 5 is a circuit block diagram of the invention.

Referring to FIGS. 3, 4 and 5, there is shown a hub having a bluetooth system in accordance with the invention. The hub comprises a housing 4 having an upstream port 40 and a plurality of downstream ports 42 thereon. Within the housing 4, there are provided a circuit board 44 including a hub module 442 and a bluetooth system module 444. The hub module 442 is coupled to the bluetooth system module 444, the upstream port 40, and the downstream ports 42 respectively. The upstream port 40 is connectable to a first electronic device (e.g., computer) having the same hub module. Also, each downstream port 42 is connectable to a peripheral having the same hub module. The bluetooth system module 444 is capable of performing a wireless signal communication with at least one second electronic device having a bluetooth system module within a predetermined range. Thus, the first electronic device and the peripheral are capable of communicating signals by means of the upstream port 40, the hub module 442, and the downstream ports 42. Also, the first and the second electronic devices are capable of communicating signals by means of the upstream port 40, the hub module 442, the bluetooth system module 444, and the downstream ports 42. As a result, wireless and cable based mini networks are formed within a predetermined range by the hub at the same time. Further, the first electronic device is connectable to the second electronic device due to the provision of the bluetooth system module 444 by the hub. This can reduce the number of cables placed on a supporting surface (e.g., desk) with the electronic device disposed thereon.

Figure 6:
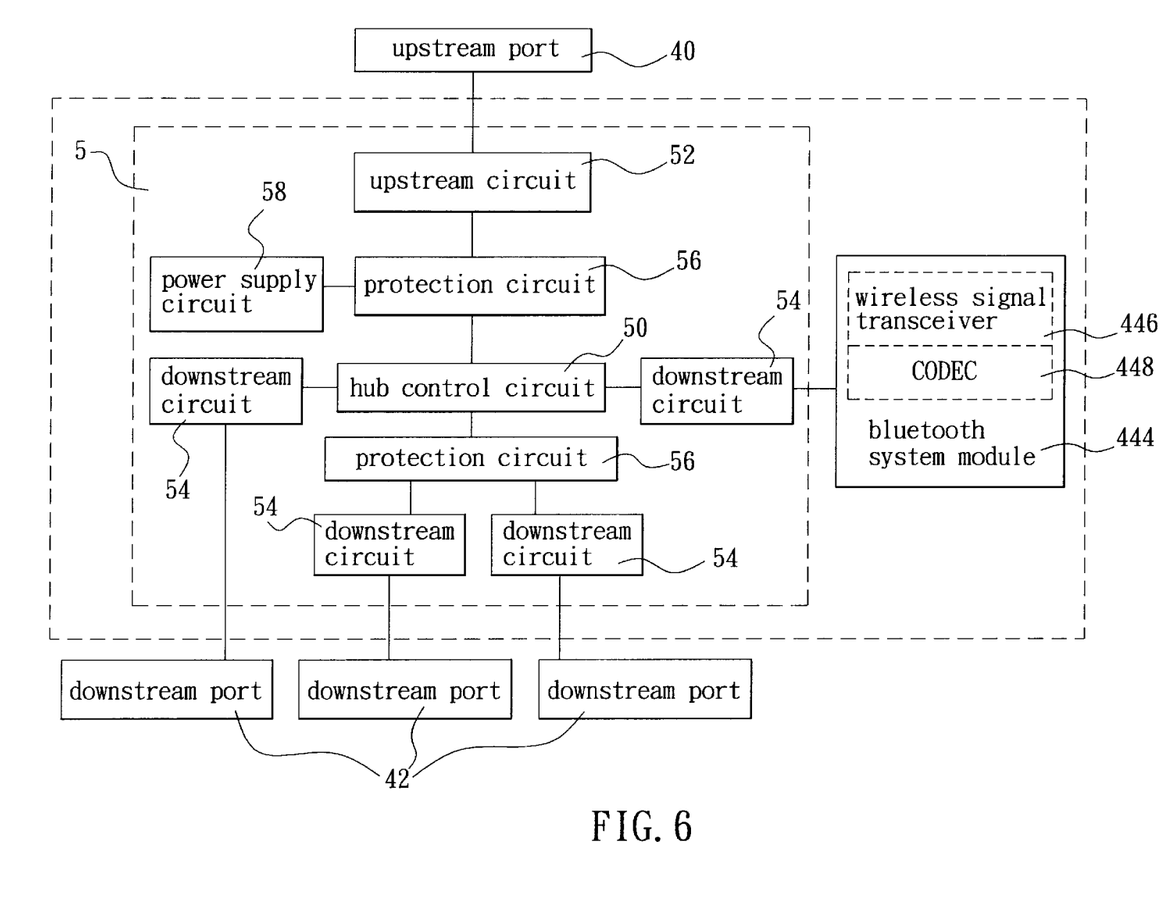
FIG. 6 is a circuit block diagram of hub module of the invention implemented as a USB hub module.

Referring to FIGS. 5 and 6, in a preferred embodiment of the invention the hub module 442 is implemented as a USB hub module 5. The USB hub module 5 comprises a hub control circuit 50, an upstream circuit 52, and a plurality of downstream circuits 54. The upstream circuit 52 is coupled to the hub control circuit 50 and the upstream port 40 respectively. Three downstream ports 42 are coupled to three downstream circuits 54 respectively. Also, the bluetooth system module 444 is coupled to another downstream circuit 54. The hub control circuit 50 is interconnected between two downstream circuits 54. The bluetooth system module 444 further comprises a wireless signal transceiver 446 and a CODEC (coder/decoder) 448. In the embodiment, the upstream port 40, the upstream circuit 52, the hub control circuit 50, the downstream circuits 54, and the downstream ports 42 are operative to communicate signals between the first electronic device and the peripheral. Note that a number of processing steps performed by the hub control circuit 50 regarding USB signal are well known after the hub control circuit 50 has received the USB signal from either the upstream circuit 52 or the downstream circuits 54. Thus a detailed description thereof is omitted herein for the sake of brevity.

Figure 7:
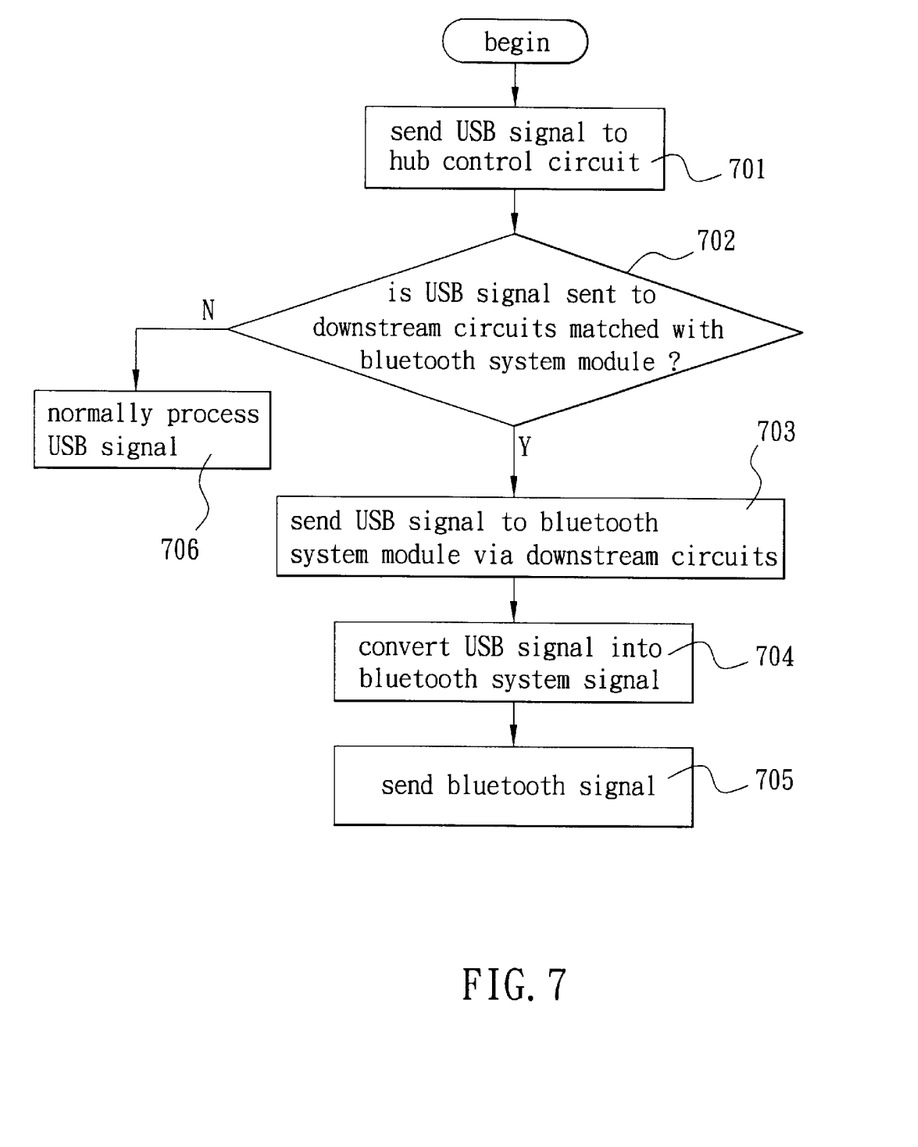
FIG. 7 is a flow chart illustrating a process of sending data from a first electronic device to a second electronic device according to the invention.

Referring to FIG. 7, there is shown a process of sending data from the first electronic device to the second electronic device by the hub in between according to the invention. The process comprises the following steps:

Step 701: Send the USB signal received by the upstream port 40 to the hub control circuit 50 via the upstream circuit 52.

Step 702: It is determined by the hub control circuit 50 whether the USB signal is intended for sending to the downstream circuits 54 matched with the bluetooth system module 444. If yes, the process goes to step 703. Otherwise, the process jumps to step 706.

Step 703: Send the USB signal to the bluetooth system module 444 via the downstream circuits 54 matched with the bluetooth system module 444.

Step 704: The CODEC 448 converts the USB signal into a bluetooth system signal.

Step 705: Send the bluetooth signal from the wireless signal transceiver 446 prior to ending the process.

Step 706: Process the USB signal in accordance with a normal procedure regarding the USB signal.

Figure 8:
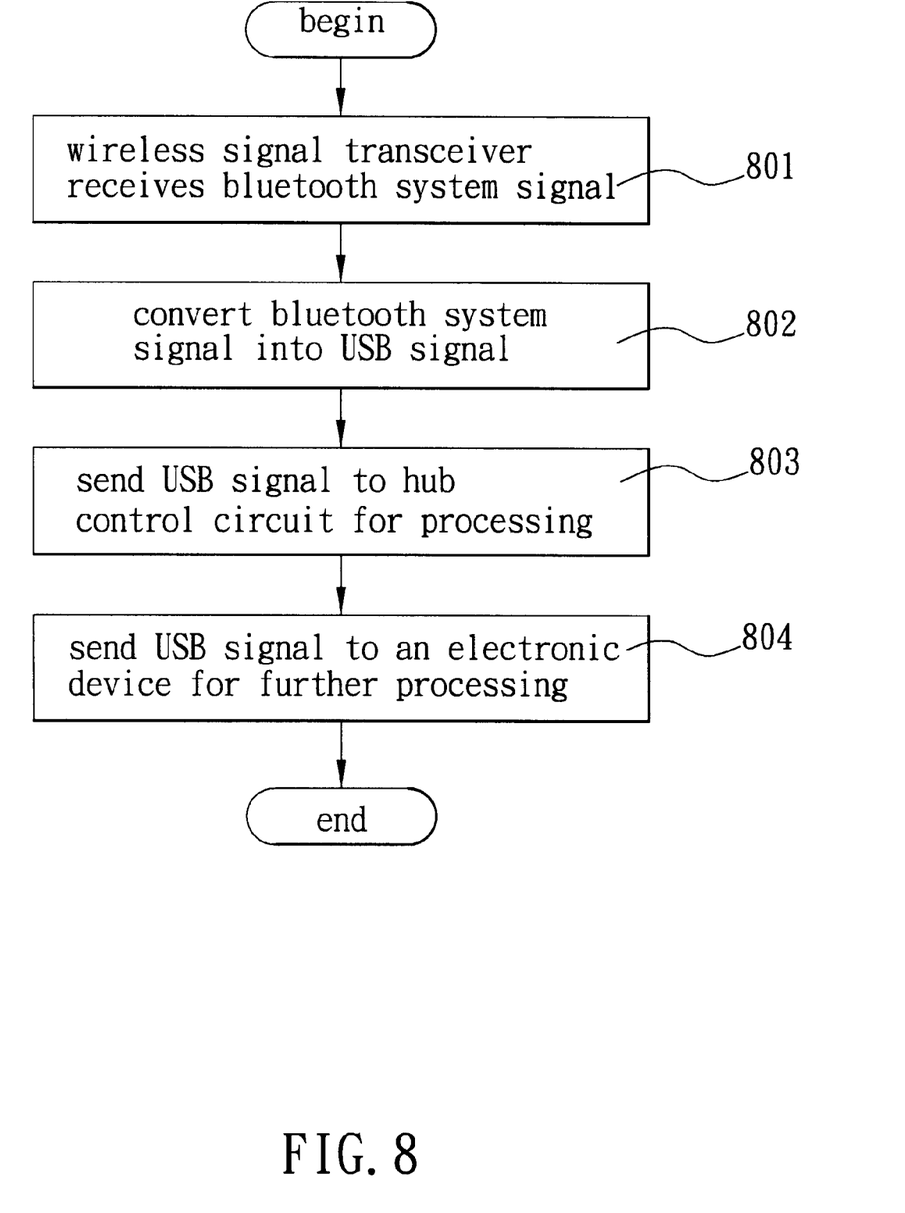
FIG. 8 is a flow chart illustrating a process of sending data from the second electronic device to the first peripheral according to the invention.

Referring to FIG. 8, there is shown a process of sending data from the second electronic device to the first electronic device by the hub in between according to the invention. The process comprises the following steps:

Step 801: The wireless signal transceiver 446 receives the bluetooth system signal from the second electronic device.

Step 802: The CODEC 448 converts the bluetooth system signal into a USB signal.

Step 803: Send the USB signal from the downstream circuits 54 matched with the bluetooth system module 444 to the hub control circuit 50. In the hub control circuit 50, process the USB signal in accordance with a normal procedure regarding the USB signal.

Step 804: Send the USB signal to the first electronic device for further processing.

Referring to FIG. 6 again, in the embodiment there are provided two protection circuits 56 in the USB hub module 5. One of the protection circuits 56 is interconnected between two downstream circuits 54 and the hub control circuit 50 which is in turn interconnected between another two downstream circuits 54. The other protection circuit 56 is interconnected between the upstream circuit 52 and the hub control circuit 50. The other protection circuit 56 is further coupled to a power supply circuit 58. The power supply circuit 58 is powered by the first electronic device after the hub is coupled to the first electronic device. Hence, power for maintaining a normal operation of the hub can be provided by the power supply circuit 58. The protection circuits 56 are automatically activated for disconnecting either the upstream circuit 52 and the downstream circuits 54 from the hub control circuit 50 or the power supply circuit 58 from the hub control circuit 50 if an abnormal condition occurs either in a signal transmission process between the upstream circuit 52 or the downstream circuits 54 and the hub control circuit 50 or in a power transmission from the power supply circuit 58 to the hub. This can protect the hub control circuit 50, the upstream circuit 52, and the downstream circuits 54.

Referring to FIG. 4 again, in another preferred embodiment of the invention, the circuit board 44 further comprises a connection section 441 coupled to the hub module 442. The bluetooth system module 444 is provided on another circuit board 46 which has another connection section 462. The connection section 462 of another circuit board 46 is coupled to the connection section 441. As a result, the bluetooth system module 444 and the hub module 442 are coupled together. When the bluetooth system module 444 is malfunctioned, a user can remove the malfunctioned bluetooth system module 444 prior to mounting a new bluetooth system 444 on the circuit board 44. Hence, a maintenance of the hub is made easy, convenient.

What is claimed is:

1. A hub having a bluetooth system comprising:

a housing;

a first circuit board in the housing;

a hub module on the first circuit board;

an upstream port on the housing, the upstream port having one end coupled to the hub module and the other end connectable by a first cable to a first electronic device having the same hub module;

a plurality of downstream ports on the housing, each of the downstream ports having one end coupled to the hub module and the other end connectable by a second cable to a peripheral having a corresponding hub module so that the first electronic device and the peripheral are capable of communicating signals by means of the upstream port, the hub module, the downstream ports, and said first and second cables; and a bluetooth system module on the first circuit board, the bluetooth system module being coupled to the hub module for performing a wireless signal communication with a corresponding second bluetooth module in at least one second electronic device situated within a predetermined range of the hub, thereby communicating signals between the first electronic device and the second electronic device by means of the first cable, the upstream port, the hub module, and the bluetooth system module coupled to the hub module for performing a wireless signal communication with the second bluetooth module in the second electronic device.

2. The hub of claim 1, wherein the hub module is a USB (Universal Serial Bus) hub module, the USB hub module comprises:

a hub control circuit;

an upstream circuit coupled to the hub control circuit and the upstream port respectively; and a plurality of downstream circuits each having one end coupled to the hub control circuit and the other end coupled to one of the downstream ports or the bluetooth system module.

3. The hub of claim 1, wherein the bluetooth system module comprises a wireless signal transceiver for either receiving a bluetooth system signal from the second electronic device or sending the bluetooth system signal received at the CODEC, and a CODEC (coder/decoder) for either converting a USB signal into the bluetooth system signal prior to sending to the wireless signal transceiver or converting the bluetooth system signal received at the wireless signal transceiver into the USB signal prior to sending to the hub module.

4. The hub of claim 1, further comprising a first connection section on the first circuit board, the first connection section being coupled to the hub module, and a second circuit board with the bluetooth system module provided thereon wherein the second circuit board has a second connection section coupled to the first connection section for coupling the bluetooth system module and the hub module together.

* * * * *